Oct. 25, 1960   P. VILLEPLÉ   2,957,364
ELECTROMAGNETIC AND ELECTROMECHANICAL
TRANSMISSIONS AND TORQUE CONVERTERS
Filed Dec. 8, 1955   8 Sheets-Sheet 1

INVENTOR
PAUL VILLEPLÉ

BY Wenderoth, Lind & Ponack
Attys.

Oct. 25, 1960

P. VILLEPLÉ

2,957,364

ELECTROMAGNETIC AND ELECTROMECHANICAL
TRANSMISSIONS AND TORQUE CONVERTERS

Filed Dec. 8, 1955

INVENTOR
PAUL VILLEPLÉ

BY *Wenderoth, Lind & Ponack*
Att'ys.

INVENTOR
PAUL VILLEPLÉ

Fig.13.

INVENTOR
PAUL VILLEPLÉ

Fig.14.

United States Patent Office 2,957,364
Patented Oct. 25, 1960

2,957,364

ELECTROMAGNETIC AND ELECTROMECHANICAL TRANSMISSIONS AND TORQUE CONVERTERS

Paul Villeplé, Paris, France, assignor to Société Civile dite: Office Technique International "O.T.I.," Paris, France Filed Dec. 8, 1955, Ser. No. 551,949

Claims priority, application France Dec. 9, 1954

5 Claims. (Cl. 74—472)

This invention relates to an apparatus for transmitting and converting a torque from a driving shaft to a driven shaft, wherein the power torque is converted into a plurality of sub-torques, for example three sub-torques; three conversion ratios are selected, the shifting from one ratio to another taking place automatically and progressively.

This device comprises essentially a first epicyclic gear having an input sun wheel and an output annulus or internally-toothed ring gear rigid with a driving shaft and a driven shaft respectively, the planet wheels being mounted on a planet carrier connected through a train of gears with a hollow shaft coaxial with said driving shaft, a plate keyed on the opposite end of this hollow shaft and carrying a first brake drum formed on the planet carrier of another epicyclic gear having its planet wheels meshing on the one hand with an internally toothed ring gear keyed on another brake drum and mounted on a freewheel hub of the so-called radial-wedging type, and on the other hand with another sun wheel mounted on said hub and rigid with a plate provided with a clutch.

The first and second brake drums are positioned within the magnetic fields of stationary electromagnets and the clutch annulus lies within the magnetic field of the windings of an electromagnet carried by a plate keyed on the driving shaft.

A manually-controlled sliding gear is provided for changing the gear ratio of the aforesaid train of gears.

The transmission ratios corresponding to the quotient of the train of gears in combination with the two epicyclic gears.

The first steep of torque variation is obtained by energizing the electromagnet winding acting on the ring gear of the epicyclic gear associated with the aforesaid freewheel.

The second steep is obtained by maintaining the energization of the first electromagnet while energizing the electromagnet of the brake drum of the epicyclic gear mounted on said freewheel.

The third steep is obtained by de-energizing both electromagnets and energizing the third electromagnet mounted on the planet wheels of the same epicyclic gear.

The progressive and degressive energizations of the electromagnets are effected automatically through a linkage system adapted to actuate slide-contacts along operative resistors through which energizing current is transmitted from a generator to the aforesaid electromagnets.

In the specific case of an automotive application this linkage system is controlled in turn positively on the one hand from the torque reaction of the housing of the generator in combination with the depression of the throttle pedal which is proportional to the engine torque, and on the other hand from the reaction torque of the torque-converter housing, this reaction torque corresponding in turn to the load torque.

The progression and regression of the aforesaid energizations are produced by the "mechanical hysteresis" of time-lag slide-contact carriers in combination with likewise delayed rockers, as will be explained presently.

The shifting from one steep to another takes place smoothly through a sufficient sliding movement of the electric couplers involved, without causing any damage to these couplers, the sliding movements thereof being constructionally of short duration and taking place only at sufficient time intervals to permit a proper cooling of the couplers if necessary.

The torque transmitting and converting apparatus according to this invention is illustrated diagrammatically in the attached drawings forming part of this specification in the form of a preferred embodiment thereof; in the different figures of the drawings the members through which the power is transmitted are shown in thick lines, the inoperative or loose members are shown in thin lines. The dotted lines represent the electromagnetic members: clutch or brakes, at the time where their energization is varying between disengagement of one steep of the transmission and engagement of the next steep. In the drawings.

Figure 1:
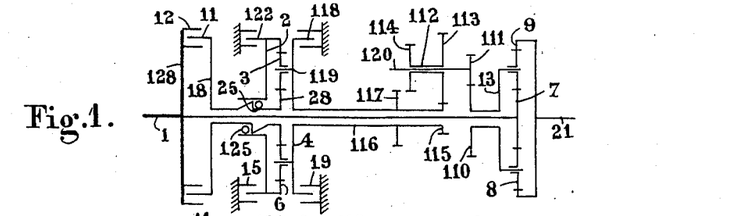
Figure 1 shows the torque converter in its neutral position, ready for forward drive operation.

Referring now to Fig. 1 of the drawings, the driving shaft 1 having an extension carrying at its free end an input sun wheel 7 of an epicyclic gear of which the output internally-toothed ring gear 9 is rigid with the driven shaft 21, the planet wheels 8 of this epicyclic gear being attached to a carrier or cage 13; the latter drives a gear 110 meshing with an outer pinion 111 keyed on a splined or like shaft 120 carrying a sliding gear 112 comprising essentially a large pinion 113 and a small pinion 114; the large-diameter pinion 113 meshes with a pinion 115 formed or keyed endwise of a hollow shaft 116 the other end of which carries through a plate 4 a brake drum 118 acting as a planet carrier 119 on which planet wheels 3 are rotatably mounted; these planet wheels 3 are in meshing engagement on the one hand with the epicyclic internally-toothed ring gear 2 provided in turn with another brake drum 122, and on the other hand with another sun gear 28 having a hub 25 carrying a freewheel 125.

The brake drum 118 is positioned in the field of a stationary electromagnet winding 19 and the other brake drum 122 lies within the field of another stationary electromagnet winding 15.

On the driving side the internally toothed annulus 2 is rotatably rigid with the outer race of the freewheel 125 of the wedge-action hub 25. This hub 25 is fast with a plate 18 carrying a clutch annulus 11 positioned in the field of another electromagnet winding secured on the plate 128 rigid with the driving shaft 1.

If the driving shaft 1 rotates at a velocity $v$ and the driven shaft 21 is stationary, for example when the brakes are applied, the windings 12, 15 and 19 are not energized since the generator driven from the engine running at idling speed does not supply current to the electromagnets, and the planet carrier 13 rotates at half the velocity of the driving shaft, i.e. $v/2$; the meshing pinions 110, 111, 113, 115 provide a driving velocity which is a multiple of $v$ according to the gear ratio of the train of gears concerned; the carrier 119 and brake drums 118, 122, are released or loose, and either the planet wheels 3 rotate or the internally toothed annulus 2 rotates loosely; in this last case the freewheel 125 is locked, the clutch annulus 11 is also released due to the non-energization of its winding 12 and therefore the whole or part of the mechanisms described hereinabove rotate loosely without transmitting any torque; consequently, this figure shows the members in a position corresponding to the neutral position of a conventional gearbox, although the device is ready to start in the direction corresponding to the forward drive.

Figure 10:
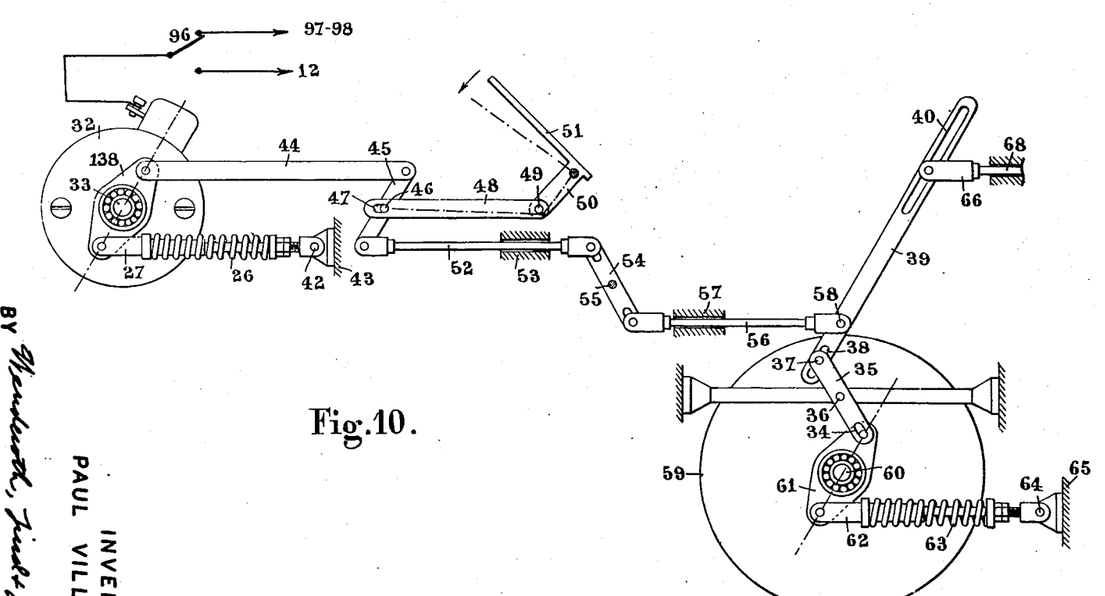
Figure 10 illustrates the linkage system utilized in the automatic transmission control, shown in the position corresponding to the neutral; the engine being either stopped or idling.
Figure 10A:
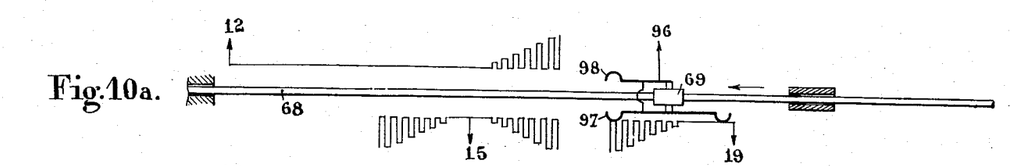
Figures 10a, 11a, 12a, 13a show diagrammatically the electric distributor corresponding to the energization of the different electromagnets of the transmission in the specific cases illustrated in Figs. 10, 11, 12 and 13, respectively.

With the different elements of the control linkage system positioned as shown in Fig. 10 if the engine is accelerated by depressing the throttle pedal the generator 32 will deliver an output current and due to the magnetic field created between the armature and the field the reaction torque will cause the generator housing to rotate in the direction of the arrow F (Fig. 11) which is the direction of rotation of the generator, thereby displacing the slide contact 69 defined hereinabove to the position indicated in Fig. 10a.

Figure 11:
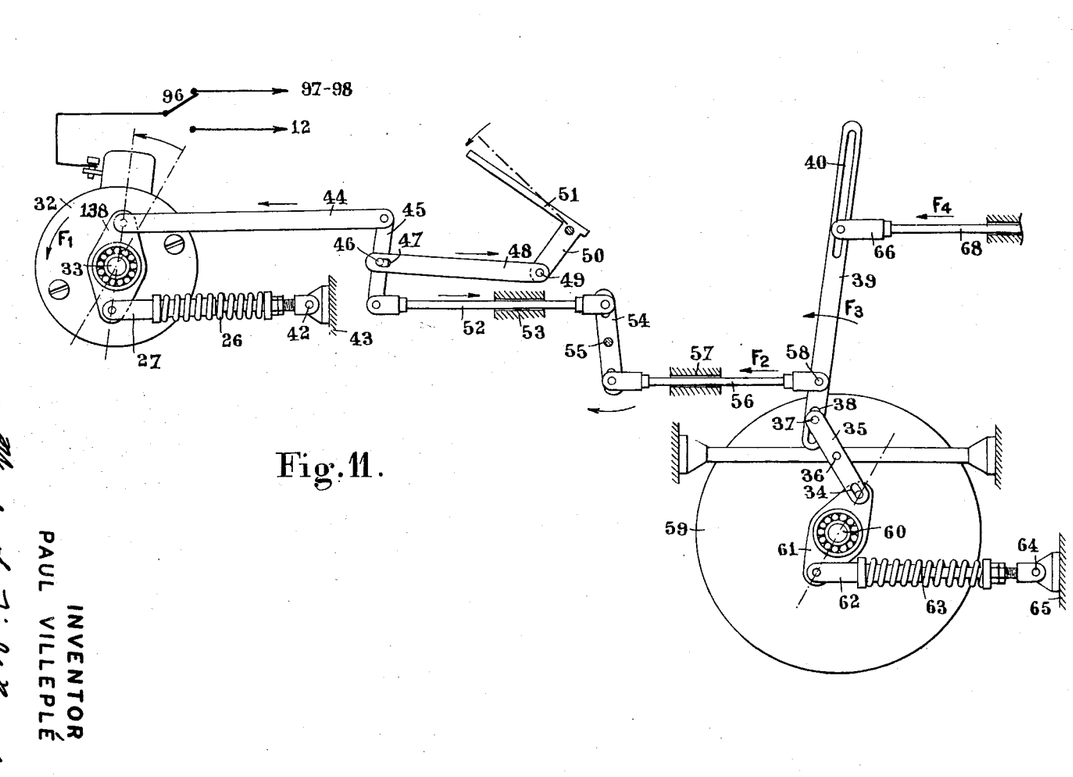
Figure 11 shows the same component elements, the vehicle being assumed to be starting downhill, i.e. under zero load conditions.

Under these conditions, the vehicle may start in spite of the moderate engine torque available, assuming for example that this start takes place in a downhill road. It would be possible to start in direct drive conditions with an ordinary gearbox. But other conditions prevail in that, whether the vehicle is on a level road or an uphill road, the driver will depress more deeply the throttle pedal 51 to attain the position shown in Fig. 13; in this case the engine torque will tend to rise to its maximum and the pedal 51 will also tend to move through its maximum stroke, the resistant or load torque also tending to reach its maximum value, and the slide contact 69 controlled through the linkage system to be described presently is thus moved to the position illustrated in Fig. 13a (corresponding to Figs. 2 and 3), i.e. to the starting and running of a vehicle as resulting from the engagement of the low or first gear of a conventional gearbox.

It is apparent that in the starting conditions corresponding to those of a start in low gear with an ordinary gearbox the reaction of the torque converter is applied by locking the freewheel 125 which prevents the internally toothed ring gear 2 from rotating faster than the coupler mounted on the plate 128, on the one hand, and on the plate 18, on the other hand.

Figure 4:
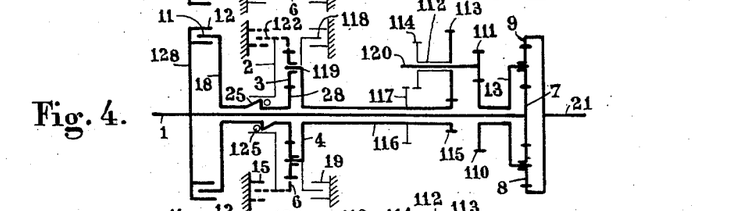
Figure 4 shows the device about to shift to the intermediate gear, this position being shown in Fig. 5.
Figure 6:
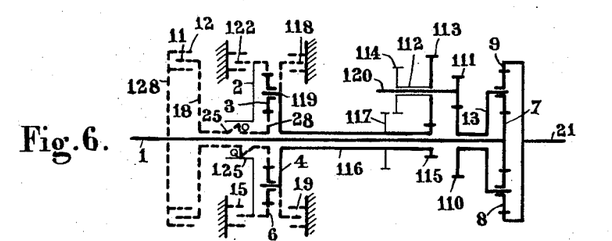
Figure 6 shows the device about to shift from the intermediate gear to the direct drive or top gear, this latter position being shown in Figure 7.
Figure 9:
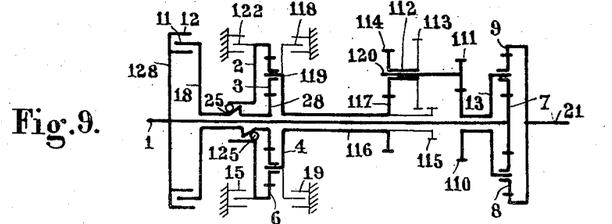
Figure 11A:
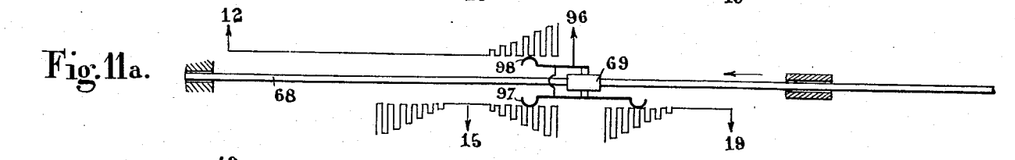

When the vehicle speed has attained a value sufficient to neutralize the starting inertia the reaction or load torque will become lesser and cause the linkage system to move the slide contact 69 to the position indicated in Fig. 11a and then to the position shown in Fig. 10a which corresponds to Figs. 4, 6 and 9 respectively.

Figure 3:
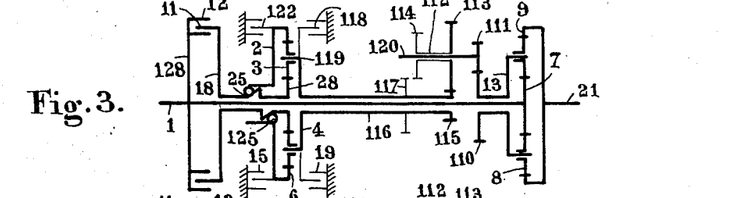
Figure 3 shows the device in the position corresponding to the first or low-gear operation of a conventional gearbox.
Figure 5:
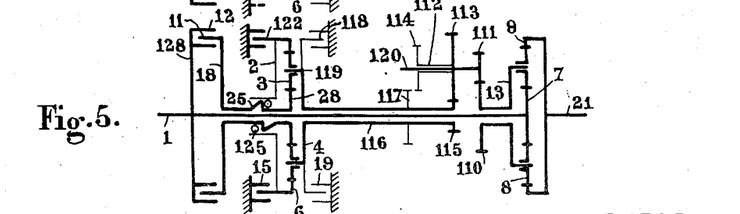

In Fig. 4 the input sun wheel 7 rotates at the same speed as the plate 18 so that the velocity of the toothed annulus 2 will be reduced progressively to zero (Fig. 5) and the driving torque transmitted to the output differential is returned through the gears 8, 13, 111, 113, 115 and the input differential 3, 2 back to the freewheel 25; the torque thus transmitted reacts against the now stationary brake drum 122 and the planet carrier 119 revolves at half the speed obtained in Fig. 3; as the gearing remains unchanged, by algebraic difference, the velocity of the driven shaft 21 is twice that of Fig. 3; it may be said that this position corresponds to the intermediate or second gear of a conventional gearbox. In this case the slide contact 69 lies between the positions indicated in Figs. 11a and 12a.

Figure 7:
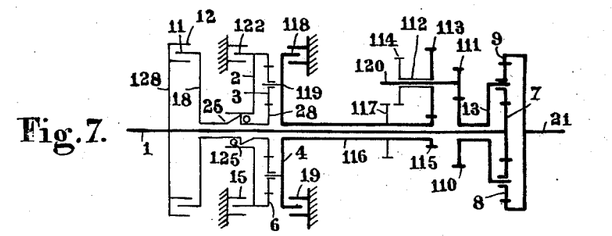

As the engine torque increases with respect to the load the energization of both windings 12 and 15 is reduced progressively to zero; in other words, the linkage system to be described presently moves the slide contact 69 to a position situated between those of Figs. 11a and 10a; thus, the clutch 11 and the brake drum 122 are free, and the freewheel 125 is unlocked; the engine torque is transmitted from the input or driving shaft 1 through the input sun wheel 7, planet wheels 8 and output sun wheel 9 to the output or driven shaft 21; the progressively increasing energization of the electromagnet winding 19 (Fig. 6) will slow the planet carrier 13 until the latter is stopped (Fig. 7), thereby transferring the reaction of the transmission torque through the train of gears 110, 111, 113 and 112 to the brake drum 118 held against motion by the saturated energization of the stationary electromagnet 19.

These conditions provide the direct drive speed in which the slide contact 69 is positioned as shown in Fig. 10a.

Now, if the sliding gear 112 is moved to engage the pinions 114 and 117 with each other, and if by construction the switch 96 (Fig. 10) disconnects the brushes 97, 98 (Figs. 10a to 13a) while connecting the electromagnet 12 in the circuit (Figs. 8 and 9) the torque converter will be in neutral and ready to start in reverse.

Figure 8:
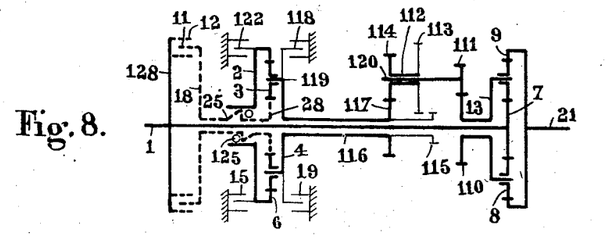
Figures 8 and 9 illustrate the shifting to reverse and the reverse position proper.

In fact, if the throttle pedal 15 is depressed progressively the generator 32 (Fig. 10) will start delivering a current adapted progressively to energize the electromagnet 12, the gears being positioned as shown in Fig. 8.

Figure 2:
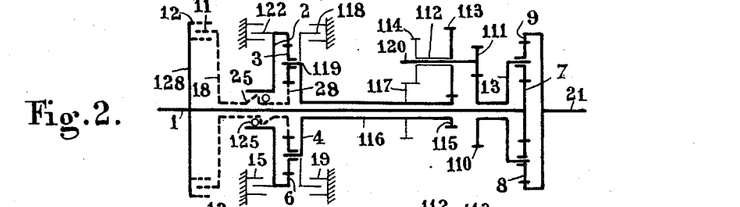
Figure 2 is a similar diagram showing the arrangement in a position corresponding to the starting in the first or low gear of a conventional gearbox.

The ratio of these pinions is so calculated that the driven shaft 21 (Figs. 8 and 9) will rotate in the opposite direction and at the same speed as in the case illustrated in Figs. 2 and 3.

Figure 9 shows the torque converter in its reverse position, the electromagnet 12 being fully energized.

Of course, the purpose of the telescopic mounting 62, 63, 64 and 65 of Figs. 10 to 13 is to counteract any angular displacement of the housing 59 which arises from the reversal of the reaction torque of this housing 59.

In the above-described example there is only one torque conversion ratio in reverse, on the analogy of conventional gearboxes.

It is also possible, without departing from the spirit and scope of this invention, to dispense with the sliding gear 112, pinions 114 and 117 (Figs. 1 to 9) and also with the switch 96 (Figs. 10 to 13) if these are replaced by a reversing gear mounted after the torque converter.

Thus, if in the gearing the gears 114 and 117 were eliminated from the transmission and a reversing gear added behind the converter, the reaction torque of the housing 59 (Figs. 10 to 13) would have the same value and direction in both forward and reverse drive, and the converter would operate automatically in the same manner in both directions, as in the case of light railway motor tractors.

The conversion of the engine torque as a function of its changes in value as well as of the value of the load torque or reaction is effected as described hereinabove by utilizing three electromagnets in combination with two epicyclic gears, a train of gears and a freewheel so as to provide a transmission having three evolutive reaction points.

Now the operation of the automatic control system utilizing the different members will be described by way of example with reference to four positions shown in Figs. 10 to 13 inclusive.

Figure 10 corresponds to Fig. 1 and shows the different members of the converter in neutral. The field windings of the engine generator 32 are carried by the generator housing so as to oscillate coaxially to the shaft 33 of its armature, and the angular displacement of these field windings rotate a lever 138 having pivoted thereon one end of a yoke 27 engaging a telescopically guided spring 26, the other end of the yoke being pivotally attached at 42 to the frame 43 of the vehicle.

At the end of the lever 138 which is diametrically opposite to the yoke 27 there is pivotally attached one end of a link 44 having its other end also pivoted on one end of a rocker 45, the fulcrum 46 of this rocker consisting of a lateral pin 46 extending through a slot 47 formed in the end portion of another link 48 the other end of which is pivoted at 49 on the lower arm 50 of a throttle pedal 51; the other end of the rocker 45 is pivoted on a rod 52 guided for axial movement in a fixed guide 53 and adapted to actuate another rocker 54 fulcrumed at 55 and controlling in turn another rod 56 also slidingly engaging a fixed guide 57; the movements of the opposite end 58 of this rod 56 correspond to the variations in the engine torque.

On the other hand the housing 59 of the change-speed gear is also mounted for oscillatory motion about an axis 60; a lever 61 rigid with this housing 59 has one end pivoted on a yoke 62 engaging a compression spring 63 bearing in turn against another yoke pivoted at 64 on the frame element 65 of the vehicle, the two yokes being connected to each other through a telescopic assembly as in the case of the generator spring 26; the other end of the cam 61 carries a lateral pivot pin extending through a slot 34 formed in one end of a rocker 35 fulcrumed at 36 and having its other end provided with a pivot pin 37 engaging a slot 38 formed in the lower arm of a straight lever 39; the other end of this lever has formed therein a relatively long slot 40 engaged by the cross-pin of a yoke 66 formed with a rod or shank 68 slidably engaging a fixed guide and controlling the aforesaid slide contact 69 (Figs. 10a to 13a) engaging the electromagnet resistors; the straight lever 39 is fulcrumed in turn on a pin 58 connected to the rod 56 mentioned hereinabove.

In Fig. 10 the engine torque and load torque are zero; under these conditions the generator 32 is stationary and its current output is also zero; besides, the resistant torque of the generator is zero and the spring 26 is fully operative to hold the cam in the position illustrated. The complete linkage system 44, 45, 52, 54, 56 position the fulcrum 58 to the so-called neutral point. On the other hand, since the load torque is zero, the other spring 63 is also fully effective with respect to the gearbox housing 59 and the rockers 35 and 39 are held against motion while the rod 68 is in its inoperative position, as well as the slide contact 69 controlled thereby (see Fig. 10a). These are the conditions of Fig. 1, i.e. the neutral position.

In Fig. 11 the throttle pedal 51 is slightly depressed and the engine picks up speed so as to cause the generator 32 to produce a current output whereby the magnetic field moves the generator housing in the direction of the arrow $F_1$ until it is balanced by the resistance of spring 26. This angular displacement is transmitted through the linkage 44, 52, 54, 56 to the fulcrum 58 so that the latter is moved in the direction of the arrow $F_2$. Assuming that the resistant torque be zero and the rocker 35 held against oscillation, the straight lever 39 will be pivoted in the direction of the arrow $F_3$ as a function of or in proportion with the angular displacement of the fulcrum 58; thus, the yoke 66 will move the rod 68 in the direction of the arrow $F_4$ and (see Fig. 11a) the slide contact 69 will engage the resistor of the electromagnet winding 12; this corresponds to the starting position shown in Fig. 2.

Figure 12:
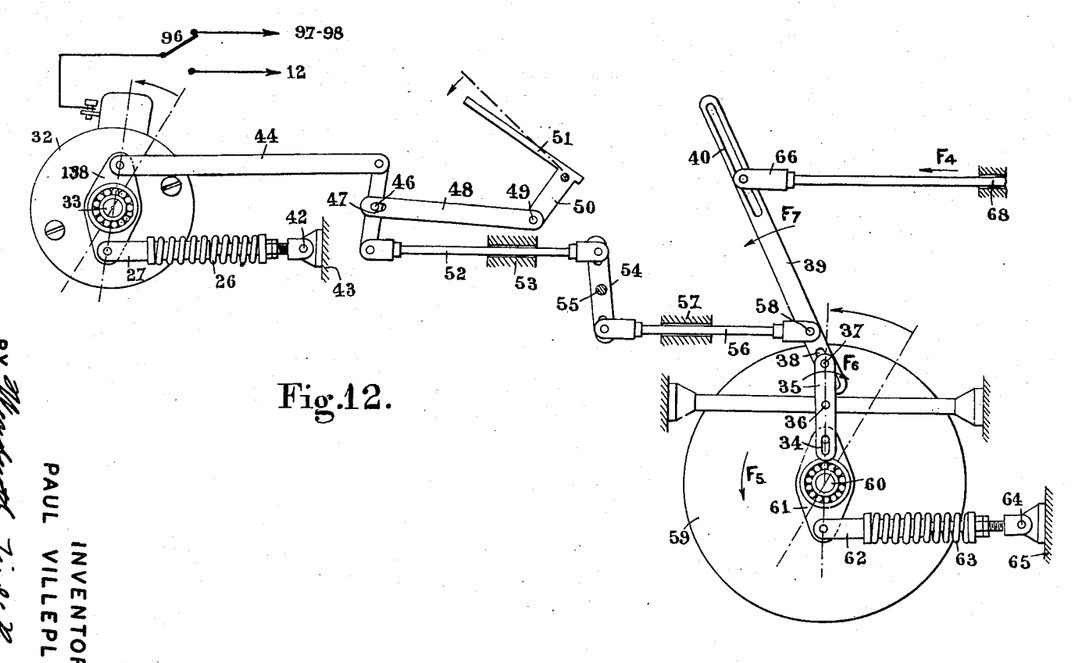
Figure 12 shows the same elements when the vehicle is starting uphill along a moderate incline, i.e. under appreciable load conditions.
Figures 12A, 13A:
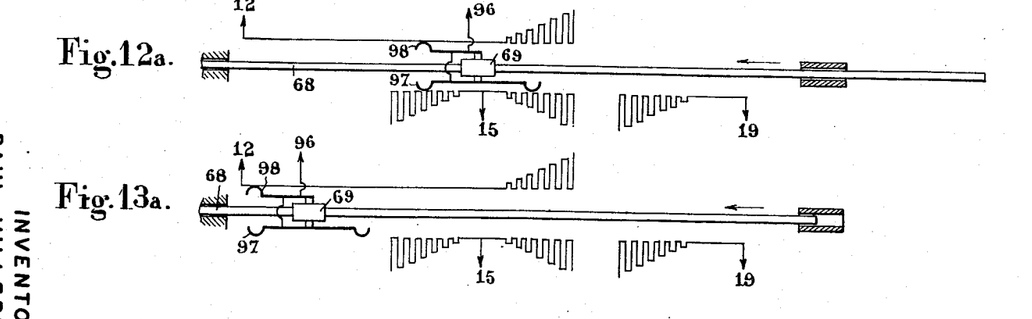

In the case illustrated in Fig. 12, the engine torque is still assumed to be zero as in the case of Fig. 11, but the load is assumed to be relatively important; the linkage 44, 52, 54, 56 remains in the position shown in Fig. 11; i.e. with the fulcrum 58 stationary; but the cam 61 has moved angularly in the direction of the arrow $F_5$ and the rocker 35 in the direction of the arrow $F_6$, thereby displacing the rocker 39 in the direction of the arrow $F_7$; this causes another displacement of the rod 68 in the same direction ($F_4$) and the slide contact 69 (Fig. 12a) to engage the electromagnet resistors 12 and 15; in this case conditions are those obtaining when the vehicle is started from zero speed in the intermediate gear, i.e. against a moderate load resistance.

Since on the one hand the engine torque is subordinate to the position of the throttle pedal and to the angular position of the generator housing, the resultant of the variations in this engine torque controls through the aforesaid linkage the position of the fulcrum 58, and on the other hand the load resistance torque causes an angular displacement of the rocker 39 on either side of the fulcrum 58, the yoke 66 will be moved to a position determined by the condition of equilibrium between the driving torque and the driven torque. Each position of this yoke 66 corresponds to a variable and progressive energization of the electromagnets 12, 15 and 19 described hereinabove with reference to Figs. 1 to 9.

Figure 13:
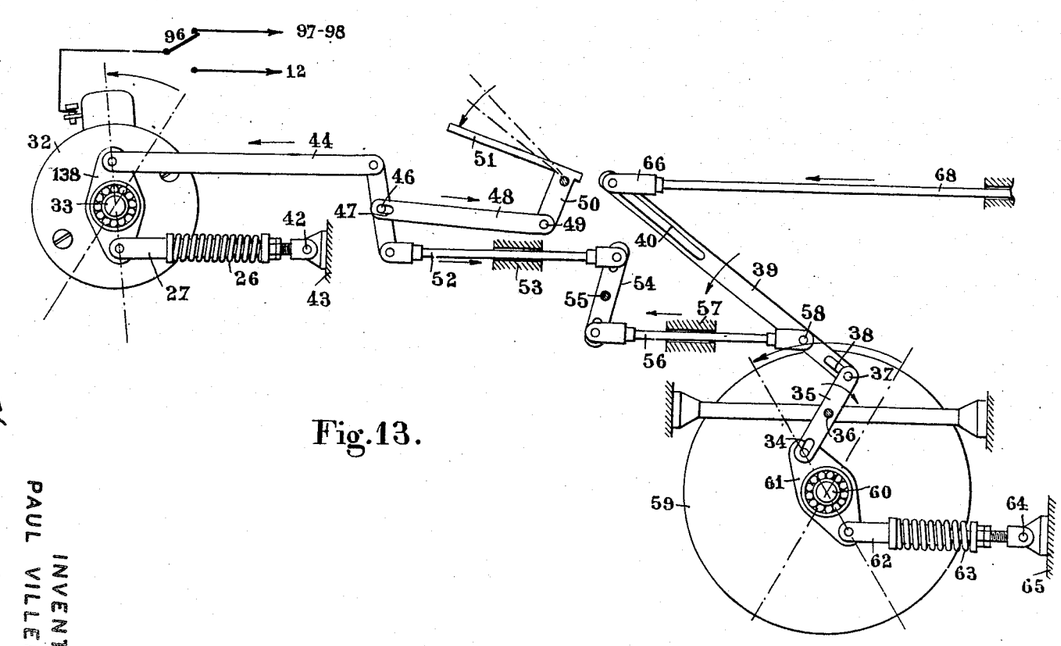
Figure 13 shows the transmission when the vehicle is starting either uphill on a steep incline or at full throttle, i.e. under very high load and power torque conditions.

The extreme positions of the slide contact 69 correspond to the extreme positions of the linkage system shown in Figs. 10 and 13 of the drawings. The variable resistors shown in Figs. 10a to 13a are inserted in the circuits of the electromagnets 12, 15 and 19 of which the operation has already been described.

However, it would not constitute a departure from the spirit and scope of this invention if the variations in the driving torque, or the variations in the resisting torque were used alone for determining the amplitude of movement of the slide contact 69.

Figure 14:
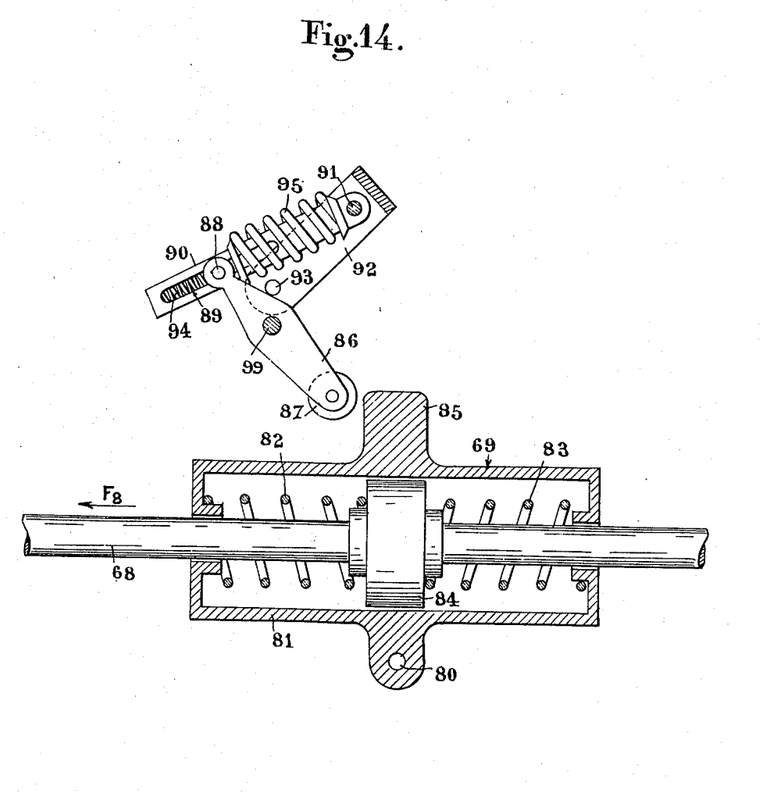
Figure 14 shows the control retarding device interposed in the linkage system.

Figure 14 shows the retarded operation of the slide contact 69 of which the brushes 97, 98 (Figs. 10a to 13a) engaging the variable electrical resistors are secured on a lug 80 of a cylinder 81 in smooth sliding engagement with the rod 68; the cylinder 81 has mounted therein a pair of opposite springs 82, 83 bearing against the shouldered opposite faces of a piston 84 also in smooth sliding engagement with the inner wall of the cylinder 81; another lug 85 projects externally of the cylinder 81 in the path of a rocker 86 fulcrumed on a fixed pin 96; this rocker 86 is provided at its lug-engaging end with a roller 87 and at its opposite end with a lateral pin 88 engaging a slot 89 of a lever 90 pivoted through a pin 91 on a yoke 92 pivoted in turn on a fixed pin 93.

The assembly consisting of the rocker 86, lever 90 and yoke 92 is balanced only in the position shown in Fig. 14 and in a position symmetrical thereto with respect to an axis passing through the centres of pins 93 and 99, due to the provisions of a pair of oppositely-acting springs 94, 95. Consequently, this assembly constitutes a toggle mechanism.

When the rod 68 is moved in the direction of the arrow $F_8$ the lug 85 engages the roller 87, thereby compressing the spring 82 and expanding the spring 83 until the equilibrium is upset and the lever and yoke assembly 90, 92 are caused to rotate to an overcentre position from which it is snapped by the springs 94, 95 to a position symmetrically opposite to that shown in Fig. 14.

The cylinder springs 82, 83 will thus release the cylinder 81 and a further time-lag may be added to this movement by filling the cylinder 81 with oil.

The return movement in a direction opposite to that indicated by the arrow F₈ takes place in the same manner, thereby enabling the slide contact 69 to move along the resistors of the electromagnets 12, 15 and 19 without any jerks and with an appreciable time-lag according as to coupler changes the torque in the step-up or in the step-down direction.

Although a preferred embodiment of this invention has been shown and described herein it will be readily understood that many modifications may be brought thereto without departing from the spirit and scope of the invention as set forth in the appended claims.

What I claim is:

1. A device for changing the ratio of conversion of a driving torque delivered by an engine shaft as a function of said torque and of the reaction torque in a driven shaft having the same axis as said engine shaft, comprising a gear-change case, a gear-change mechanism housed in said case, control means for changing the conversion ratio, said gear-change case being mounted for rotation about, but held against motion along the common axis of the driving and the driven shaft, means for creating an elastic torque urging said case for rotation in a direction opposite to that in which said reaction torque is exerted, a first member movable as a result of said driving and reaction torques and of said elastic torque, manually actuated means to vary the speed of said engine at will of the driver, corrective means sensitive to said engine speed, a second member operatively connected to both said manually actuated means and corrective means, and linkage means operatively connecting said first and second member to the gear-change control member for actuating said gear-change mechanism in the direction of decreasing gear conversion ratios when said first member moves in the direction corresponding to an increase in the reaction torque, and in the direction of increasing gear conversion ratios when said other member moves in the direction of increasing driving torques.

2. A device for changing the ratio of conversion of a driving torque delivered by an engine shaft as a function of said torque and of the reaction torque in a driving shaft having the same axis as said engine shaft, comprising a case, a variable-energization solenoid electromagnetic gear-change mechanism housed in said case, electrical means for distributing a variable voltage to the solenoids of said gear-change mechanism, a control member for changing the gear conversion ratio, said control member being adapted to actuate said electrical means in the direction of increasing gear conversion ratios when said control member is moved in one direction, and in the direction of decreasing gear conversion ratios when said control member is moved in the opposite direction, said case being mounted for rotation about, but held against motion along the common axis of the driving and the driven shafts, means adapted to develop an elastic torque urging said case for rotation in the direction opposite to that in which said reaction torque is applied, a first member displaceable as a result of said driving and reaction torques and of said elastic torque, manually actuated means to vary the speed of said engine at will of the driver, corrective means sensitive to said engine speed, a second member operatively connected to both said manually actuated means and corrective means, and linkage means operatively connecting said first and second members to said control member for operating said gear-change mechanism in the direction of decreasing gear conversion ratios when said first member moves in the direction of increasing reaction torques, and in the direction of increasing gear conversion ratios when said other member moves in the direction of increasing driving torques.

3. A device for changing the ratio of conversion of a driving torque delivered by an engine shaft as a function of said torque and of the reaction torque in a driven shaft having the same axis as said engine shaft, comprising a case, a change-gear mechanism housed in said case, solenoids for controlling said mechanism which are also housed in said case, certain solenoids being rigidly secured to said case, means for distributing variable electrical voltages to said solenoids, a control member for altering the gear conversion ratio which is adapted to actuate said voltage distributing means in the direction of increasing gear conversion ratios when said control member is moved in one direction, and in the direction of decreasing gear conversion ratios when said control member is moved in the opposite direction, said gear-change mechanism case being adapted to revolve about a fixed axis, means for creating an elastic torque urging said case for rotation in a direction opposite to that of said reaction torque, a first member displaceable as a result of said driving and reaction torques, manually operated means to vary the speed of said engine at will of the driver, corrective means sensitive to said engine speed, a second member operatively connected to both said manually actuated means and corrective means, and linkage means operatively connecting said first and second member to said gear-change mechanism control member and actuating said gear-change mechanism in the direction of decreasing gear conversion ratios when said first member moves in the direction corresponding to an increase in the driving ratios.

4. A device for changing the ratio of conversion of a driving torque delivered by an engine shaft as a function of said torque and of the reaction torque in a driven shaft having the same axis as said engine shaft, comprising a case, an electromagnetic, variable-energization solenoid change-gear mechanism housed in said case, electrical means for distributing a variable voltage to said solenoids, a control member for changing the gear conversion ratio which is adapted to actuate said means in the direction of increasing gear conversion ratios when said control member is moved in one direction, and in the direction of decreasing gear conversion ratios when said control member is moved in the opposite direction, said case being rotatably mounted about but prevented from moving along, a fixed axis, means for creating an elastic torque urging said case for rotation in the direction opposite to that of said reaction torque, a first member displaceable as a result of said driving and reaction torques and of said elastic torque, manually actuated means to vary the speed of said engine at will of the driven, corrective means sensitive to said engine speed, a second member operatively connected to both said manually actuated means and corrective means and linkage means operatively connecting said first and second members to said gear-change mechanism control member for actuating said gear-change mechanism in the direction of decreasing gear conversion ratios when said first member moves in the direction corresponding to an increase in the reaction torque, and in the direction of increasing gear conversion ratios when said other member moves in the direction of increasing driving torques.

5. A device for changing the ratio of conversion of a driving torque delivered by an engine shaft as a function of said torque and of the reaction torque in a driven shaft having the same axis as said engine shaft, comprising a case, an electromagnetic solenoid-operated gear-change mechanism wherein the solenoids energized with electric current are housed in said case, variable resistors for varying the energization of said solenoids, sliders for modifying the value of said variable resistors, a control member for modifying the gear conversion ratios by actuating said sliders in the direction of increasing gear conversion ratios when said control member is moved in one direction, and in the direction of decreasing gear conversion ratios when said control member is moved in the opposite direction, said case being adapted to revolve about, but held against motion along, a fixed axis, means for creating an elastic torque urging said case for rotation in a direction opposite to that of said reaction torque, a first member displaceable as a result of said driving and reaction torques and of said elastic torque, manually actuated means to vary the speed of said engine at will of the driver, corrective means sensitive to said engine speed, a second member operatively connected to both said manually actuated means and corrective means, and linkage means operatively connecting said first and second members to said gear conversion ratio modifying control member in the direction of decreasing gear conversion ratios when said first member is moved in the direction corresponding to an increase in the reaction torque, and in the direction of increasing gear conversion ratios when said other member is moved in the direction corresponding to increasing driving torques.

References Cited in the file of this patent

UNITED STATES PATENTS

| | | |
|---|---|---|
| 1,870,076 | Thompson | Aug. 2, 1932 |
| 2,168,956 | Kohl | Aug. 8, 1939 |
| 2,200,890 | Murray | May 14, 1940 |

FOREIGN PATENTS

| | | |
|---|---|---|
| 697,911 | Great Britain | Aug. 2, 1932 |
| 1,068,790 | France | Feb. 10, 1954 |